Figure 1:
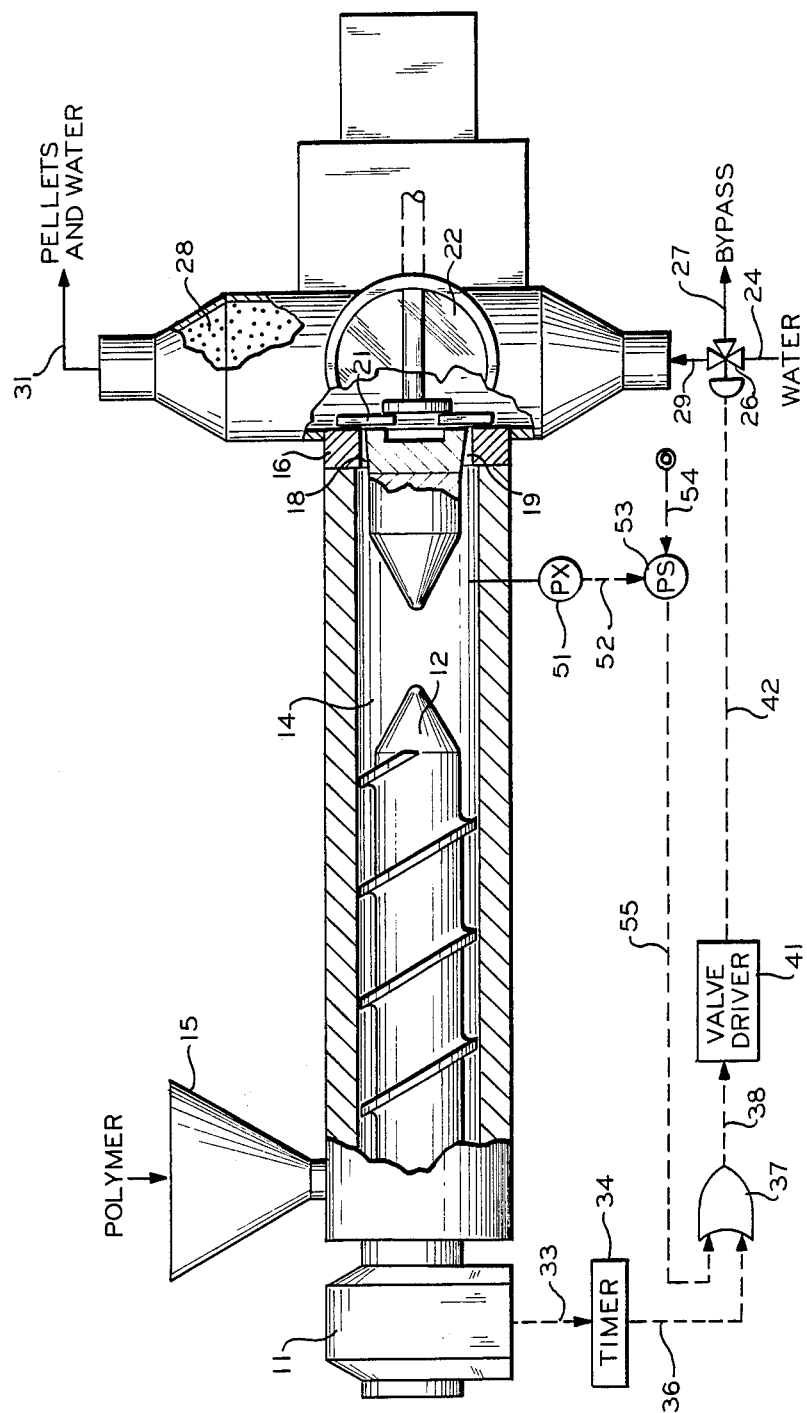

United States Patent [19]

Voss

[11] Patent Number: 4,759,889
[45] Date of Patent: Jul. 26, 1988

[54] PELLETIZER CONTROL

[75] Inventor: Raymond G. Voss, Bartlesville, Okla.

[73] Assignee: Phillips Petroleum Company, Bartlesville, Okla.

[21] Appl. No.: 663,019

[22] Filed: Oct. 19, 1984

[51] Int. Cl.$^4$ .......................... B29B 9/00; B29C 47/92
[52] U.S. Cl. .................................... 264/40.1; 264/142; 264/40.6; 425/67; 425/135; 425/155
[58] Field of Search ................... 264/40.1, 40.6, 141, 264/142, 143; 425/135, 67, 155, 160, 164, 146, 162, 170, 173

[56] References Cited

U.S. PATENT DOCUMENTS

| 3,259,175 | 7/1966 | Kraus et al. | 425/155 X |
| 3,467,987 | 9/1969 | Foster | 425/313 |
| 3,544,540 | 12/1970 | Houser | 260/94.9 |
| 4,038,002 | 7/1977 | Inaba et al. | 425/136 |
| 4,102,958 | 7/1978 | Wertz | 264/40.6 |
| 4,179,819 | 12/1979 | Pryor | 34/12 |
| 4,327,050 | 4/1982 | Salmon | 264/142 |

FOREIGN PATENT DOCUMENTS 46-11570  3/1971  Japan .................................. 425/135

Primary Examiner—Jan H. Silbaugh
Assistant Examiner—Mary Lynn Fertig
Attorney, Agent, or Firm—Williams, Phillips & Umphlett

[57] ABSTRACT

In a pelletizing operation in which a synthetic thermoplastic polymeric material is reduced to particulate form, automatic startup of the flow of cooling fluid to the cutting chamber associated with the pelletizing operation is provided so as to insure that the flow of the cooling fluid is started at the time required.

6 Claims, 1 Drawing Sheet

PELLETIZER CONTROL

This invention relates to the control of the flow of cooling fluid to a pelletizer.

Pelletization is an operation common to the manufacture of many synthetic thermoplastic polymeric materials ("polymers"). Pelletization is typically utilized to reduce polymers to particulate form for ease of storage and shipping.

Underwater pelletizers are commonly used pelletization systems and such systems are provided by a number of manufacturers such as Farrel and The Japan Steel Works, Limited.

In an underwater pelletization system, molten polymer is extruded through die orifices into a housing which is flooded with water provided from a water circulating system which is generally temperature controlled. Cutting knives, rotating in close proximity to the die face, cut off the emerging strands of molten polymer to form pellets which are quickly quenched in the water. The pellet and water slurry is then removed from the housing for further processing (dewatering and drying).

Control of the flow of water to the pelletizer when the pelletizing operation is initiated is extremely important. If the flow of water is started too soon, the polymer will have a tendency to solidify in the die orifices which is extremely undesirable. Also, if the flow of water is started too late after initiation of the pelletizing operation, the pellets will remain in a molten state and will have a tendency to clump together behind the cutting blades which is also undesirable.

Most pelletizers are equipped with a window through which the die plate and the cutting operation can be viewed. In the past it has been common to control the flow of water to the pelletizing operation by having an operator observe the die plate through the pelletizer window. Typically, the flow of water was manually started as the first material came through the die orifices.

Operators, through experience, can become proficient at starting the water flow at the proper time. However, different operators have different reaction times which may result in differences in the time the water flow is initiated. Also, careful training of new operators is required and in all cases the operator feels a heavy load of responsibility since a failure to start the water flow at the appropriate time can result in the requirement to shut down the entire pelletizing operation.

It is thus an object of this invention to provide an automatic control system for initiating the flow of water or other cooling fluid to a pelletizing operation in such a manner that operator intervention is not necessary and uniform startup of the cooling fluid flow to the pelletizing operation is provided.

In accordance with the present invention, a timer is initiated when the extruder motor for the pelletizing operation is started up. A set time period later the timer will initiate operation of a valve system so as to start the flow of water or other cooling fluid to the pelletizing operation. Preferably, a signal representative of the actual pressure in the extruder chamber is compared to a signal representative of the pressure in the extruder chamber at which polymer will begin passing through the die orifices into the cutter housing with the results of this comparison being utilized as a supplemental control for the flow of water or other cooling fluid to the pelletizing operation. In this manner, automatic control of the flow of water or other cooling fluid to a pelletizing operation is provided without the need for operator intervention.

Other objects and advantages of the invention will be apparent from the foregoing brief description of the invention and the claims as well as the detailed description of the drawing which is briefly described as follows:

FIG. 1 is a diagrammatic illustration of a pelletizing operation and the associated control system of the present invention.

The invention is described in terms of a pelletizer which is generally known as an underwater pelletizer. In such a pelletizer, the housing for the cutting knives is flooded with water. However, the invention is also applicable to other pelletizers such as spray pelletizers where water is sprayed into the cutting chamber and dry face pelletizers where high velocity air is circulated through the cutting chamber to act as the quenching and transport medium for the pellets.

Also, the invention is described in terms of specific electronic components which can be utilized to implement the invention. However, the invention could be implemented in software on a digital computer if desired.

Referring not to FIG. 1, a pelletizing operation is illustrated very broadly. Also, the pelletizing operation will be described hereinafter only in very broad terms since most of the details of operation of a pelletizing system play no part in describing the present invention.

An extruder motor 11 drives an extruder screw 12. A polymer such as polyethylene or polypropylene is introduced into the extruder chamber 14 through the hopper 15. The polymer will be heated and will be forced through the extruder chamber 14 to the die plate 16. At the die plate 16, the molten polymer passes through a plurality of orifices which are represented by orifices 18 and 19 into the cutting chamber 28. The knife 21 rotates in close proximity to the die plate 16 and cuts off the emerging strands of molten polymer to form pellets. The cutting operation may be viewed through the window 22.

Water is provided through conduit 24 to the 3-way valve 26. From the 3-way valve 26, the water may be vented through conduit 27 or may be passed into the cutting chamber 28 through conduit 29. The water flowing through conduit 29 passes through the cutting chamber 28, which is maintained in a flooded condition, and the pellet and water slurry is removed through conduit 31 for further processing.

The pelletizing operation described to this point is a conventional pelletizing operation. Again, pelletizing systems of the general type illustrated in FIG. 1 may be obtained from a number of manufacturers.

Automatic control of the introduction of water into the cutting chamber 28 is accomplished as follows:

A signal 33, which is representative of the operating state of the extruder motor 11 (on or off), is provided to the timer 34. Using digital logic, signal 33 will generally change state (from 0 to 5 volts would be typical) when the extruder motor is turned on.

It is noted that, during the startup procedure for a pelletizing operation, a number of other units are turned on or positioned prior to the turn on of the extruder motor. However, since the startup procedure for a pelletizer is well known, such additional elements of the startup procedure are not described herein.

It is also noted that, while the invention is described in terms of a change from a low logic level to a high logic level as being an initiating change, the opposite logic could be used if desired.

When the extruder motor 11 turns on, signal 33 causes the initiation of the timer 34. At the end of a predetermined period of time, the timer 34 will cause the output signal 36 to go from a low to a high state (again, 0 to 5 volts would be typical). This will cause the output signal 38 from the OR gate 37 to go to a high state which initiates the valve driver 41. The valve driver 41, which is conventional, acts through signal 42 to switch the control valve 26 such that water is allowed to flow through conduit 29 and flood the cutting chamber 28.

If desired, the output signal from the timer 34 can be provided directly as the control signal for the valve driver 41. However, preferably, the actual pressure in the extruder chamber 14 is also utilized to control the flow of water to the cutting chamber 28 so as to insure that the flow of water to the cutting chamber 28 is initiated at the proper time. This is accomplished as follows:

Pressure transducer 51 in conjunction with a pressure sensing device, which is operably located in the extrusion chamber 14, provides an output signal 52 which is representative of the actual pressure in the extrusion chamber 14. Signal 52 is provided as a first input to the pressure switch 53.

The pressure switch 53 is also provided with a set point signal 54 which is representative of the pressure in the extrusion chamber 14 at which molten polymer will begin to enter the cutting chamber 28. In operation, the output signal 55 from the pressure switch 53 will be in a low state until such time as the pressure represented by signal 52 is equal to or greater than the pressure represented by signal 54. At this time the output signal 55 will go to a high state which will again cause a change in the state of signal 38 so as to actuate the valve driver 41. Thus, if either signal 55 or 36 is high, signal 38 will go high to actuate the valve driver.

In operation, signal 36 will typically go high before signal 55. Thus, signal 55 is being utilized as a backup for control based on the startup of the extruder motor 11. Again, use of this backup is not required but is preferred.

The timer 34 may be set at any suitable time. Typically, the time is determined experimentally by observing the time which elapses between the startup of the extruder motor and the time when polymer begins to enter the cutting chamber 28. This time will generally be in the range of about 3 to about 5 seconds.

In like manner, signal 54 may be set at any desired pressure. Again, the desired pressure will generally be determined experimentally by determining the pressure in the extruder chamber 14 at which polymer will begin to enter the housing 28. This pressure will generally be in the range of about 100 to about 200 psi.

In summary, primary control of the initiation of the flow of water to the cutting chamber 28 is based on an elapsed time from the startup of the extruder motor. Preferably, a backup control based on pressure in the extruder chamber 14 is also utilized. In this manner, a uniform startup procedure is provided which substantially reduces the chances of the water flow not being initiated at the proper time with respect to an operator initiating the flow of water manually.

The invention has been described in terms of a preferred embodiment as illustrated in FIG. 1. Again, the pelletizer system can be obtained from a number of manufacturers. Also, specific elements of the control system such as pressure transducer 51, pressure switch 53 and 3-way control valve 26 are each well known, commercially available control components such as are described at length in Perry's Chemical Engineer's Handbook, 4th edition, chapter 22, McGraw-Hill.

The timer 34, OR gate 37 and valve driver 41 were all implemented on an Allen Bradley Model 2/30 Programmable Controller.

While the invention has been described in terms of the presently preferred embodiment, reasonable variations and modifications are possible by those skilled in the art. Such modifications and variations are within the scope of the described invention and the appended claims.

That which is claimed is:

1. In a pelletization system in which an extruder motor is utilized to force a synthetic thermoplastic polymeric material through an extrusion chamber by means of an extruder screw, in which said synthetic thermoplastic polymeric material passes from said extrusion chamber through die orifices into a cutting chamber and in which a cooling fluid is introduced into said cutting chamber to cool the pelletized synthetic thermoplastic polymeric material in said cutting chamber and remove said pelletized synthetic thermoplastic polymeric material from said cutting chamber, the improvement comprising:

means for establishing a first signal which is in a first state when said extruder motor is off and is in a second state when said extruder motor is on;

a timer which provides a second signal which is in a first state when said timer has not been initiated or is counting and which is in a second state when said timer has reached the end of a time period T after said timer is initiated;

means for controlling the flow of said cooling fluid to said cutting chamber;

means for providing said first signal to said timer, wherein said timer is initiated when said first signal changes from said first state to said second state;

means for actuating said means for controlling the flow of said cooling fluid in response to said second signal, wherein said means for controlling the flow of said cooling fluid is actuated to introduce said cooling fluid into said cutting chamber when said second signal changes from said first state to said second state;

means for establishing a third signal representative of the actual pressure in said extrusion chamber;

means for establishing a fourth signal representative of the pressure in said extrusion chamber at which it is desired to initiate the flow of cooling fluid to said cutting chamber;

means for comparing said third signal and said fourth signal and for establishing a fifth signal, wherein said fifth signal is in said first state if the pressure represented by said third signal is less than the pressure represented by said fourth signal and is in said second state if the pressure represented by said third signal is equal to or greater than the pressure represented by said fourth signal; and means for actuating said means for controlling the flow of said cooling fluid in response to said third signal, wherein said means for controlling the flow of said cooling fluid is actuated to introduce said cooling fluid into said cutting chamber when said fifth signal changes from said first state to said second state.

2. Apparatus in accordance with claim 1 wherein said means for controlling the flow of said cooling fluid is a control valve and wherein said means for actuating said means for controlling the flow of said cooling fluid in response to said second signal and said means for actuating said means for controlling the flow of said cooling fluid in response to said fifth signal comprises:
- an OR gate;
- means for providing said second signal and said fifth signal as inputs to said OR gate;
- a valve driver which provides a control signal to said control valve; and
- means for providing the output signal from said OR gate to said valve driver, wherein said valve driver is initiated to cause the actuation of said control valve in such a manner that said cooling fluid is introduced into said cutting chamber if either said second signal or said fifth signal is in said second state.

3. Apparatus in accordance with claim 2 wherein said pelletization system is an underwater pelletizer and said cooling fluid is water.

4. In a pelletization process in which an extruder motor is utilized to force a synthetic thermoplastic polymeric material through an extrusion chamber by means of an extruder screw, in which said synthetic thermoplastic polymeric material passes from said extrusion chamber through die orifices into a cutting chamber and in which a cooling fluid is introduced into said cutting chamber to cool pelletized synthetic thermoplastic polymer material in said cutting chamber and remove said pelletized synthetic thermoplastic polymeric material from said cutting chamber, the improvement comprising the steps of;
- establishing a first signal which is in a first state when said extruder motor is off and is in a second state when said extruder motor is on;
- providing said first signal to a timer, wherein said timer is initiated when said first signal changes from said first state to said second state and wherein said timer provides a second signal which is in said first state when said timer has not been initiated or is counting and which is in said second state when said timer has reached the end of a time period T after said timer is initiated;
- actuating a means for controlling the flow of said cooling fluid in response to said second signal so as to introduce said cooling fluid into said cutting chamber when said second signal changes from said first state to said second state;
- establishing a third signal representative of the actual pressure in said extrusion chamber;
- establishing a fourth signal representative of the pressure in said extrusion chamber at which it is desired to initiate the flow of cooling fluid to said cutting chamber;
- comparing said third signal and said fourth signal and establishing a fifth signal, wherein said fifth signal is in said first state if the pressure represented by said third signal is less than the pressure represented by said fourth signal and is in said second state if the pressure represented by said third signal is equal to or greater than the pressure represented by said fourth signal; and
- actuating said means for controlling the flow of said cooling fluid in response to said third signal so as to introduce said cooling fluid into said cutting chamber when said fifth signal changes from said first state to said second state.

5. A method in accordance with claim 4 wherein said means for controlling the flow of said cooling fluid is a control valve and wherein said step of actuating said means for controlling the flow of said cooling fluid in response to said second signal and said step of actuating said means for controlling the flow of said cooling fluid in response to said fifth signal comprises:
- providing said second signal and said fifth signal as inputs to an OR gate;
- providing the output signal from said OR gate to a valve driver; and
- providing a control signal from said valve driver to said control valve, wherein said valve driver is initiated to cause the actuation of said control valve in such a manner that said cooling fluid is introduced into said cutting chamber if either said second signal or said fifth signal is in said second state.

6. A method in accordance with claim 5 wherein said pelletization process is an underwater pelletization process and said cooling fluid is water.

* * * * *